July 26, 1960

G. DOPPLMAIER 2,946,342

DRAIN VALVE

Filed Feb. 25, 1957

INVENTOR.
GEORGE DOPPLMAIER
BY
*Lothrop & West*

ATTORNEYS

United States Patent Office 2,946,342
Patented July 26, 1960

2,946,342

DRAIN VALVE

George Dopplmaier, Rte. 1, Box 204B, Orland, Calif.

Filed Feb. 25, 1957, Ser. No. 642,076

5 Claims. (Cl. 137—217)

The invention relates to valves for draining fluid confining conduits, and, more particularly, to valves which are in closed position when the pressure within a conduit is in excess of a predetermined amount and which are in open position when the pressure falls below said predetermined amount.

There is an ever widening trend toward irrigation using overhead sprinkling systems. These systems ordinarily comprise an elongated conduit such as an aluminum pipe extending from a central water source to the area being irrigated. Such conduits are frequently as long as fifteen hundred feet, with a diameter of as much as six inches or more. The pipes are disposed horizontally and at an elevation of two to three feet above the subjacent ground surface, and may be used, for example, in connection with irrigation apparatus of the type disclosed in United States Patent Number 2,156,711 granted to Darrell C. Mansur on July 25, 1950. At other timese the pipe is supported directly on the ground. Since it frequently becomes necessary to move the pipe array from one location to another as irrigation of any particular area is completed, it is quite apparent that the task of moving a length of pipe perhaps one thousand feet long and filled with water becomes enormous.

It is equally apparent that if the water or other fluid within a pipe arrangement of this nature could be drained readily, prior to removal, that the task of relocating the pipe array would be greatly simplified.

It is therefore an object of the invention to provide a valve for rapidly draining a fluid filled conduit.

It is another object of the invention to provide a drain valve which is self-actuating and therefore does not require individual attention in order to accomplish fluid drainage.

It is still another object of the invention to provide a valve which is economical to make and use.

It is a further object of the invention to provide a valve which, while relatively simple to install, securely maintains its position even though subjected to the considerable buffeting given to pipe arrays of the portable variety.

It is still a further object of the invention to provide a drain valve which does not result in undesirable pitting of the subjacent soil as drainage takes place.

It is yet a further object of the invention to provide a drain valve which has but a few parts and which therefore is durable and long lived.

It is another object of the invention to provide a drain valve which tightly seals the conduit when the conduit is under its normal high pressure and which therefore obviates the loss of fluid.

It is still a further object of the invention to provide a generally improved drain valve.

Other objects, together with the foregoing, are attained in the embodiment described in the following description and shown in the accompanying drawings in which.

Figure 1:
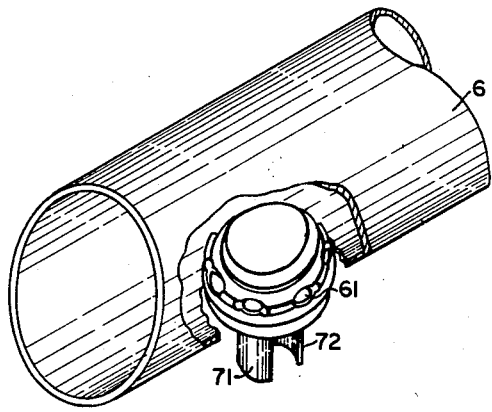
Figure 1 is a perspective of a typical conduit having a preferred embodiment of the valve mounted therein, a portion of the conduit being broken away more clearly to reveal the construction of the valve.
Figure 2:
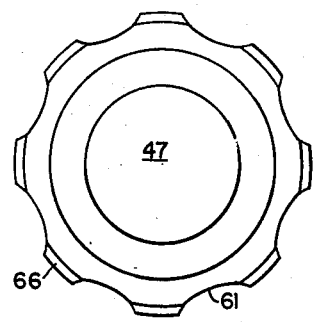
Figure 2 is a plan of the valve.
Figure 3:
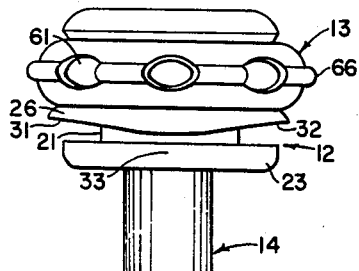
Figure 3 is a front elevation.
Figure 4:
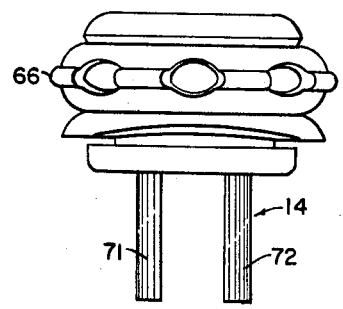
Figure 4 is a side elevation.

While the improved drain valve of my invention is susceptible of numerous physical embodiments, depending upon the environmental characteristics and the requirements of use, a very considerable number of the herein shown and described embodiments have been made and used, and have performed in an eminently satisfactory manner.

At suitable intervals along the length of a conduit 6, such as a circular pipe, there is provided a plurality of vertical openings 7, ordinarily circular in outline. Preferably the openings 7 are so disposed that they are located at the bottom of the pipe, and thus permit maximum drainage from the pipe interior when drainage is to be effected.

The valve, generally designated by the numeral 11, is fabricated from a flexible material, such as rubber, and includes three major elements, namely, a valve body 12, a bulb 13 and a fluid-deflecting portion 14.

The valve body 12 comprises a hollow cylindrical plug 21 having a central interior bore 22, or channel, concentric with the pipe opening 7, the diameter of the plug 21 being equal to or even slightly exceeding the diameter of the pipe opening, therefore fitting snugly within the opening 7. Projecting laterally from the plug 21 and preferably formed integrally therewith is an outer annular flange 23 disposed in closely fitting engagement with the margin or periphery of the outer surface 24 of the pipe walls adjacently surrounding the pipe opening. In somewhat comparable fashion, an inner annular flange 26 projects radially outwardly from the plug 21 to form a disc-shaped element in close engagement on its outer surface 27, or side, with the adjacent inner surface 28 of the pipe wall surrounding the opening 7. Preferably, and as appears most clearly in Figures 3 through 6, the outer surface of the inner flange 26 is tapered symmetrically as at 31 and 32 on opposite sides of a central vertical plane 33, running in a fore and aft direction with respect to the pipe, so that the conformation of the portions 31 and 32 is substantially coincident with the adjacent slope of the arcuate pipe walls. Leakage is thereby minimized. Owing to the resilience of the plug 21 and the inner and outer flanges an even tighter seal than ordinary is obtained where, as in Figure 6, the valve is in its closed or collapsed position. In closed position, the superposed water pressure adjacent the inner flange as well as the downward thrust resulting from the collapsed state of the valve causes a movement or "flow" of the resilient material forming the valve body 12, with a consequent very tight sealing of the pipe opening and elimination of fluid loss. As can be noted most clearly from Figures 5 and 6, the "flow" of the resilient body material even causes a slight upward curling of the outer margin 36 of the outer flange so as to engage tightly the adjacent pipe wall surface, the space 37 between the margin and the pipe wall disappearing as can be seen by especial reference to Figure 6. In sum, even though the initial fit in the opening 7 is snug, the interior pressure causes a still tighter engagement.

The upper or inner end of the plug 21, and more particularly the central portion of the inner flange 26, is slightly elevated to form an annular valve seat 41 which is held to reasonably close tolerances in order to form a tight engaging fit with a cap 46, or head, which, while it may be of the same resilient material as the valve body 12, is considerably thicker which thus provides substantial beam strength and resistance to bending. Conveniently, the cap 46 on its upper surfaces 47 as appears in Figures 3 through 6 is of stream-lined nature so as to minimize frictional losses within the conduit when fluid flow is taking place. On the other hand, the lowermost surface 48 of the cap 46 is flat or planar so that the engagement between the face 48 and the adjacent valve seat 41 will result in maximum fluid tightness.

Interspersed between the inner flange 26 and the cap 46 and forming with the cap 46 the flattened bulbous element, generally designated 13, is a hollow cylinder 51, or barrel, defining a hollow or interior cavity 52, the barrel being in communication with the plug bore 22, or channel, when the cap 46 is in spaced location with respect to the valve seat 41.

While the preferred form of the barrel 51 is in the outwardly bowed conformation illustrated, it is also to be recognized that the barrel walls could be bowed inwardly so as to provide a comparable resiliency tending to urge the cap 46 away from the seat 41.

In either event, the walls of the barrel are pierced by a plurality of elliptical apertures 61 radially disposed and lying within a transverse plane substantially at right angles to the vertical axis 63 of the valve. The total or combined cross sectional area of the barrel walls is thereby reduced to a minimum adjacent the transverse plane, causing the sharpest folding to take place in this vicinity as appears in Figure 6.

It has been found that the valve is capable of greatly extended life, however, by provision of a strengthening bead 66 molded to the barrel periphery between each of the adjacent apertures. Without the bead 66, folding of the walls occurs exactly at the transverse plane containing the minimum cross sectional area of material. Where, however, the bead 66 is provided, folding takes place as indicated most clearly in Figure 6 and indicated by the numerals 67 and 68. The extent or sharpness of folding is therefore not as great as would be the case were the bead absent; thus the life of the valve is greatly increased.

The number, size and shape of the apertures are preferably substantially as shown in the drawing, and the aperture numbers and dimensions are selected with relation to the cross-sectional area of the discharge bore 22. By appropriate choice of variables and by proportioning the apertures 61 and the bore 22 a conduit fluid pressure in excess of a predetermined amount will cause the valve to close, the discharge from the bore 22 being greater in amount than the in-flow of fluid from the pipe interior through the apertures 61. In this situation the pressure outside of the bulbous element 13, and more particularly the pressure exerted on the upper-most face of the cap 46, causes substantially instantaneous deformation of the barrel 51 into the collapsed attitude shown most clearly in Figure 6, with a consequent tight seating of the cap 46 against the valve seat 41. As appears in Figure 6, with the cap 46 in tight seating engagement with the valve seat 41 there is no possibility of outward flow of the interior fluid from within the conduit and sealing is effectively performed. While other arrangements of the apertures 61 are possible it has been found that with apertures having the approximate size, location, and shapes shown in the drawing the barrel 51 collapses substantially symmetrically so that there is the tightest possible engagement between the cap 46 and the valve seat 41. In other words, by having a considerable number of relatively small apertures there is less likelihood of a canting or tilting engagement between the cap and valve seat than would be the case where a fewer number of large apertures are utilized.

Figure 5:
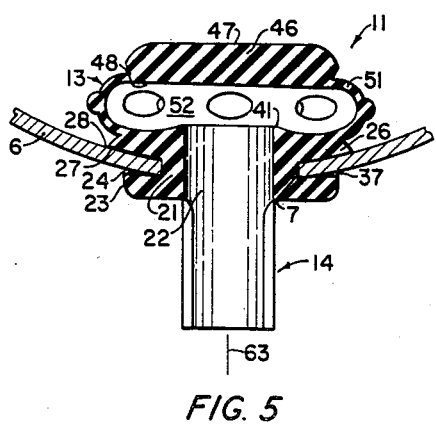
Figure 5 is a median vertical section, showing the valve in its open or fluid draining position.
Figure 6:
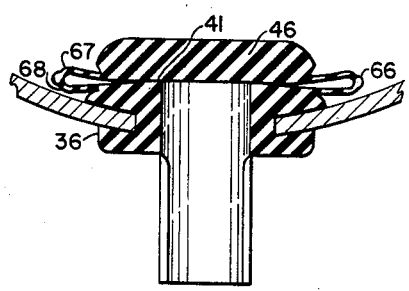
Figure 6 is a view comparable to that Figure 5 but showing the valve in its closed or collapsed or fluid confining state.

When pressure within the conduit is relieved, and drops below a predetermined amount, the inherent resilience within the barrel walls 51 urges the cap 46 upwardly against the fluid pressure tending to hold the valve in seated position, and, at the moment the pressure falls below such predetermined amount, the cap 46 is urged quickly upwardly into its open position, as shown most clearly in Figure 5. At this juncture, the fluid within the pipe is free to move inwardly through the apertures 61 and into the interior cavity 52 of the bulb from which point it travels outwardly through the bore 22 and to the outside.

While the disposition of the apertures 61 in conjunction with the effect of the earth's rotation tends to produce a spiralling outward flow of the fluid through the bore 22, and which thus leads to a considerable amount of lateral deflection or scattering of the water, as distinguished from a solid stream capable of pitting the ground below, it is sometimes preferable to provide auxiliary mechanism for even more thoroughly breaking up the water stream. Consequently, a pair of depending arcuate walls 71 and 72 disposed on opposite sides of the channel 22 is provided. The thickness of the walls 71 and 72 are substantially less than the thickness of the balance of the valve and are consequently of a more flexible or pliable nature. Consequently, when the water is discharged downwardly through the channel 22 in generally spiral fashion and strikes the depending walls 71 and 72 a violent agitation is set up within the walls 71 and 72, the motion being random in nature and causing a considerable amount of random deflection of the water stream in various directions and breaking up the water flow in any one direction.

It can therefore be seen that I have provided a highly efficient yet simple and long-lived valve which is extremely effective to block the escape of any water from a closed vessel or conduit when the fluid pressure within such vessel or conduit exceeds a predetermined value, and yet which serves quickly and safely to drain the confined fluid when the fluid pressure drops below such predetermined amount, such desirable characteristics being obtained, furthermore, without costly and time-consuming manual adjustment and attention.

What is claimed is:

1. A valve adapted to drain fluid through an opening in a curved conduit, said valve comprising a rubber-like disc having a central channel, inner and outer flanges on said disc and spaced to define a groove to receive the conduit wall, said inner flange having an outer side contoured to conform to the adjacent inner surface of the curved conduit walls surrounding said opening, said inner flange also having an innner side elevated to form an annular valve seat concentric with said opening and surrounding the channel in said disc, an apertured resilient barrel mounted on the outer margin of said inner flange, a stiff planar cap closing the inner end of said barrel and movable in correspondence with the deformation of said barrel between a first location overlying but spaced from said valve seat and a second location abutting said valve seat with the material of said valve seat deflected toward said opening in said conduit leaving a planar surface on said valve seat contacting said planar cap.

2. A valve for use in an aperture in the wall of a circular cylindrical pipe comprising a unitary rubber-like member including a plug adapted to be disposed in said aperture and having a channel extending therethrough, an outer flange projecting from said member to underlie said pipe around said aperture, an inner flange projecting from said member to contact said pipe around said aperture, said inner flange having a surface adjacent said pipe, said surface being tapered and conformed substantially to the arcuate curvature of said pipe wall, a bulb merging with and extending radially beyond said flanges, said bulb having a plurality of apertures therein around the equator thereof, a cap included in said bulb in confronting relationship with said inner flange and of an extent to overlie said channel and to overlie at least a portion of said inner flange which is in contact with said pipe.

3. A valve as in claim 2 and including an integral equatorial bead around said bulb whereby said bulb is stiffened between said apertures.

4. A valve as in claim 2 and including a pair of integral arcuate walls depending from said outer flange on opposite sides of and in part continuing said channel.

5. A valve as in claim 2 in which said pipe aperture has a predetermined diameter and including an integral raised seat on the interior margin of said inner flange surrounding said channel, the diameter of said raised seat being less than said predetermined diameter.

References Cited in the file of this patent

UNITED STATES PATENTS

| | | |
|---|---|---|
| 670,794 | Lott | Mar. 26, 1901 |
| 1,315,955 | Gill | Sept. 16, 1919 |
| 1,969,118 | Brucker | Aug. 7, 1934 |
| 2,369,170 | Motsinger | Feb. 13, 1945 |
| 2,512,694 | Stout | June 27, 1950 |
| 2,640,481 | Conley | June 2, 1953 |
| 2,646,059 | Wittner | July 21, 1953 |
| 2,674,262 | Bradshaw | Apr. 6, 1954 |
| 2,771,904 | Sherman | Nov. 27, 1956 |
| 2,793,649 | Hamer | May 28, 1957 |
| 2,797,703 | Edwards | July 2, 1957 |

FOREIGN PATENTS

| | | |
|---|---|---|
| 16,917 | Holland | Sept. 15, 1927 |
| 735,590 | Great Britain | Aug. 24, 1955 |